US009522684B2

United States Patent
Kimura et al.

(10) Patent No.: US 9,522,684 B2
(45) Date of Patent: Dec. 20, 2016

(54) CALIPER BRAKE DEVICE FOR RAILWAY VEHICLE

(71) Applicant: NIPPON STEEL & SUMITOMO METAL CORPORATION, Tokyo (JP)

(72) Inventors: Ryouichi Kimura, Tokyo (JP); Kazuaki Fujita, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/898,490

(22) PCT Filed: Jun. 16, 2014

(86) PCT No.: PCT/JP2014/065878
§ 371 (c)(1),
(2) Date: Dec. 15, 2015

(87) PCT Pub. No.: WO2014/203848
PCT Pub. Date: Dec. 24, 2014

(65) Prior Publication Data
US 2016/0137213 A1    May 19, 2016

(30) Foreign Application Priority Data

Jun. 19, 2013 (JP) ................................. 2013-128695

(51) Int. Cl.
*F16D 55/224* (2006.01)
*B61H 5/00* (2006.01)
(Continued)

(52) U.S. Cl.
CPC ............ *B61H 5/00* (2013.01); *B61H 15/0028* (2013.01); *B61H 15/0092* (2013.01);
(Continued)

(58) Field of Classification Search
CPC .............. F16D 55/2245; F16D 55/2255; F16D 2125/68; B61H 15/0028
(Continued)

(56) References Cited

U.S. PATENT DOCUMENTS 5,176,227 A * 1/1993 Kohler .................. B60T 17/081
188/153 R
5,253,736 A * 10/1993 Kohler .................. B60T 17/081
188/170
(Continued)

FOREIGN PATENT DOCUMENTS

DE  WO 2011095423 A1 * 8/2011 ......... F16D 55/2245
JP     2005-133798         5/2005
(Continued)

*Primary Examiner* — Thomas Irvin
(74) *Attorney, Agent, or Firm* — Clark & Brody

(57) ABSTRACT

A tip of a pneumatic brake cylinder device is attached rotatably at a base side of a caliper body, and a base end of a first brake lever is attached rotatably to an end part of a cylinder at a side opposite to where the rod protrudes. A center part of the first brake lever is rotatably attached to the body. A front part end of a second brake lever is rotatably attached to a tip of the body, and the base ends thereof come into contact with a tip of the first brake lever. A brake lining and a brake head are attached on an inner surface at a tip of a pressing-force transmission member disposed at a center part front part of the second brake lever. A torque-receiving pin tip is immobilized at the brake head, and a shaft is held on the body via a spherical washer.

2 Claims, 4 Drawing Sheets

(51) Int. Cl.
    F16D 55/2255    (2006.01)
    F16D 65/12      (2006.01)
    F16D 65/18      (2006.01)
    B61H 15/00      (2006.01)
    F16D 65/56      (2006.01)
    F16D 121/02     (2012.01)
    F16D 125/04     (2012.01)
    F16D 125/68     (2012.01)

(52) U.S. Cl.
    CPC ......... F16D 55/2255 (2013.01); F16D 65/12 (2013.01); F16D 65/18 (2013.01); F16D 65/567 (2013.01); F16D 55/2245 (2013.01); F16D 2121/02 (2013.01); F16D 2125/04 (2013.01); F16D 2125/68 (2013.01)

(58) Field of Classification Search
    USPC ........ 188/71.7, 71.8, 71.9, 72.6, 72.9, 24.12
    See application file for complete search history.

(56) References Cited

U.S. PATENT DOCUMENTS

| | | | | |
|---|---|---|---|---|
| 5,813,499 A | * | 9/1998 | Staltmeir | B61H 5/00 188/59 |
| 6,722,477 B1 | * | 4/2004 | Wolfsteiner | B61H 5/00 188/173 |
| 7,328,778 B2 | * | 2/2008 | Djordjevic | B66C 9/18 188/170 |
| 7,413,061 B2 | * | 8/2008 | Wagner | B61H 15/0028 188/1.11 E |
| 8,006,816 B2 | * | 8/2011 | Kraus | B60T 17/083 188/170 |
| 8,763,765 B2 | * | 7/2014 | Ebner | F16D 65/567 188/196 V |
| 8,770,351 B2 | * | 7/2014 | Engels | B60T 17/228 188/1.11 E |
| 8,794,393 B2 | * | 8/2014 | Argirovski | F16D 55/2245 188/196 D |
| 9,145,282 B2 | * | 9/2015 | Schautt | B66B 5/18 |

FOREIGN PATENT DOCUMENTS

| | | | |
|---|---|---|---|
| JP | 2008-019893 | 1/2008 | |
| JP | 2008-261439 | 10/2008 | |
| JP | 2009-085429 | 4/2009 | |
| JP | 5312784 B2 * | 10/2013 | ............... B61H 5/00 |

* cited by examiner (a)

(b)

(a)

(b)

though the pneumatic caliper brake device proposed in Patent Reference 1 can be made more compact than a conventional pneumatic caliper brake device. Another problem is that the operating range of the pneumatic brake cylinder device increases as wear of the disc and the brake lining progresses, because the mechanism adjusting the clearance between the disc and the brake lining is provided within the brake cylinder.

CALIPER BRAKE DEVICE FOR RAILWAY VEHICLE

TECHNICAL FIELD

The present invention relates to a caliper brake device which imparts a braking force on both side surfaces of a wheel of a railway vehicle by clamping a brake disc (referred to below simply as a disc) that rotates together with the wheel.

BACKGROUND ART

A pneumatic-hydraulic converter is required in cases where air is used as a pressure medium in a railway vehicle which employs a hydraulic caliper brake device which uses hydraulic oil as a pressure medium. Accordingly, in recent years, there has developed a tendency to use pneumatic caliper brake devices in order to reduce or eliminate hydraulic power units.

However, in order for railway vehicle to utilize pneumatic caliper brake devices which have lower output than hydraulic caliper brake devices, the pneumatic brake cylinder devices have become larger, which increases the size of the device as a whole, thus making it difficult to install it in a limited space.

Accordingly, the invention of Patent Reference 1 made use of a lever principle in order to enable the use of a small-sized pneumatic brake cylinder.

However, in the pneumatic caliper brake device proposed in Patent Reference 1, a brake head and a brake lining are installed in a floating configuration on the side of one end of a brake lever provided in a railway bogie so that they freely rotate bidirectionally. Therefore, there is a large load on the rotating portions and the sliding portions of the brake lever because of a counter-pressure force and a braking torque which both operate during braking when the brake lever places a load on the brake head and the brake lining Likewise, there is a large load on the brake lever and on the rotating portions and the sliding portions of the brake lever when vibration acts on the caliper brake device, because a pneumatic brake cylinder device provided at the other end of the brake lever is also installed in a floating configuration.

The pneumatic caliper brake device proposed in Patent Reference 1 provides a mechanism adjusting a clearance between the disc and the brake lining within the brake cylinder. Therefore, the operating range of the pneumatic brake cylinder device increases because a protruding length of a pressing rod coupled to the brake lever increases as wear between the disc and the brake lining progresses.

PRIOR ART REFERENCES

Patent References

Patent Reference 1: Japanese Patent Application Kokai Publication No. 2008-261439

SUMMARY OF THE INVENTION

Problems to be Solved by the Invention

One problem which the present invention aims to solve is that there is a large load on the rotating portions and the sliding portions of the brake lever, even though the pneumatic caliper brake device proposed in Patent Reference 1 can be made more compact than a conventional pneumatic

Means for Solving these Problems

The present invention was designed with the object of further reducing the size of a pneumatic caliper brake device, and with the object of increasing durability by reducing the load on the rotating portions and the sliding portions of the brake lever.

The caliper brake device for a railway vehicle according to the present invention comprises:

a caliper body formed with two branches so that a front part is positioned on an outer side of two outer side surfaces of a periphery of a disc when a base part side is installed on a bogie;

a pneumatic brake cylinder device installed at a base part side of the caliper body;

a first brake lever having base part ends rotatably attached respectively to a tip of a rod of the pneumatic brake cylinder device and to a cylinder end portion at a side opposite to where the rod protrudes, and having a center part rotatably attached to the caliper body, so as to faun a pair of respective front parts which move toward and away from each other, due to a protruding and retracting motion of the rod;

a second brake lever having front part ends rotatably attached respectively to the tips of the branches of the caliper body, and having the base part ends respectively making contact with the tips of the first brake lever, so as to form a pair which moves toward and away from each other, following a toward-and-away motion of the first brake lever;

a pressing-force transmission member provided at the front part of a center part of the second brake lever, and which is designed to protrude or retract, following a toward-and-away motion of the second brake lever;

a brake head disposed at the tip of the pressing-force transmission member, and a brake lining disposed on an inner side corresponding to the brake head; and a torque-receiving pin immobilizes a tip at each respective brake head, and causes a shaft part to be supported at the end portions of each of the branches of the caliper body via spherical bearings, wherein a braking torque is caused to be received by the caliper body via the brake head, the torque-receiving pin, and the spherical bearings, when the rod of the pneumatic cylinder device is caused to protrude, and the brake lining presses against the disc via the first and second brake levers, the pressing-force transmission member, and the brake head.

The caliper brake device for a railway vehicle according to the present invention is able to reduce the size of the pneumatic brake cylinder device and the brake lever, because the lever mechanism for the pneumatic brake cylinder device has two stages, namely a first brake lever and a second brake lever.

Moreover, the caliper brake device for a railway vehicle according to the present invention is able to transmit a counter-pressure force during braking to the caliper body via the brake lining, the brake head, the pressing-force transmission member, and the second brake lever. On the other hand, a braking torque generated during braking is transmitted to the caliper body via the brake lining, the brake head, the torque-receiving pin, and the spherical bearings.

Yet further, in the caliper brake device for a railway vehicle according to the present invention, the only component installed on the brake lever in a floating configuration is the pneumatic brake cylinder device, so as to support the brake lining and the brake head on the caliper body via the torque-receiving pin and the spherical bearings. It is therefore possible to reduce the load on the rotating portions and the sliding portions of the of the brake lever when vibration loads on the caliper brake device.

When a clearance adjustment mechanism is provided to the pressing-force transmission member of the caliper brake device for a railway vehicle according to the present invention to adjust the clearance between the two brake linings and the disc, the operating range of the brake cylinder device does not become large, even if wear of the disk and brake linings progresses.

Advantageous Effects of the Invention

According to the present invention, it is possible to further reduce the size of the pneumatic brake cylinder device and the brake lever, because the lever mechanism of the pneumatic brake cylinder device has two stages, namely a first brake lever and a second brake lever. It is therefore possible to eliminate hydraulic power units in a cost-effective manner, because hydraulic caliper brake devices can be replaced without making alterations on the railway bogie side.

Furthermore, load on the rotating portions and the sliding portions of the first and second brake levers is reduced and durability is increased, because torque generated during braking is transmitted to the caliper body via the brake lining, the brake head, the torque-receiving pin, and the spherical bearings.

Moreover, the only component installed on the brake lever in a floating configuration is the pneumatic brake cylinder device, so as to support the brake lining and the brake head in the caliper body via the torque-receiving pin and the spherical bearings. It is therefore possible to reduce the load on the rotating portions and the sliding portions of the of the brake lever when vibration loads on the caliper brake device, and durability is increased.

In addition, when a clearance adjustment mechanism between the brake linings and the brake disc is provided to the pressing-force transmission member, the operating range of the pneumatic brake cylinder device does not increase in size, even if wear of the disk and brake linings progresses. It is therefore possible to further reduce the size of the pneumatic brake cylinder device.

BRIEF DESCRIPTION OF THE DRAWINGS

FIG. 1 (*a*) is a view from above the wheel. FIG. 1 (*b*) is a view from a side of the wheel.

FIG. 2 (*b*) is a detailed drawing showing an enlarged view of portion C of FIG. 2 (*a*).

FIG. 3 (*b*) is a detailed drawing showing an enlarged view of portion D of FIG. FIG. 3 (*a*).

EMBODIMENT

Figure 1:
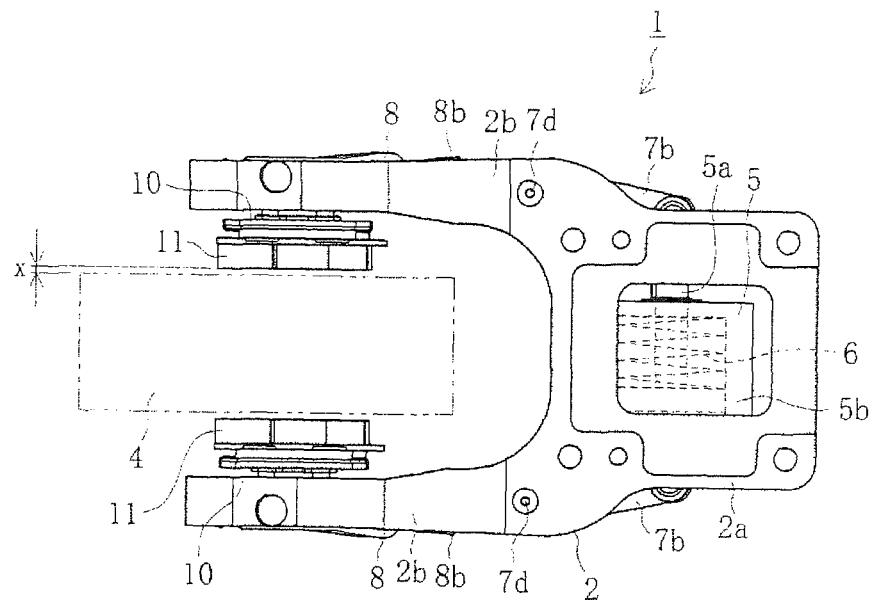
FIG. 1 is a drawing describing the caliper brake device for a railway vehicle according to the present invention.
Figure 1:
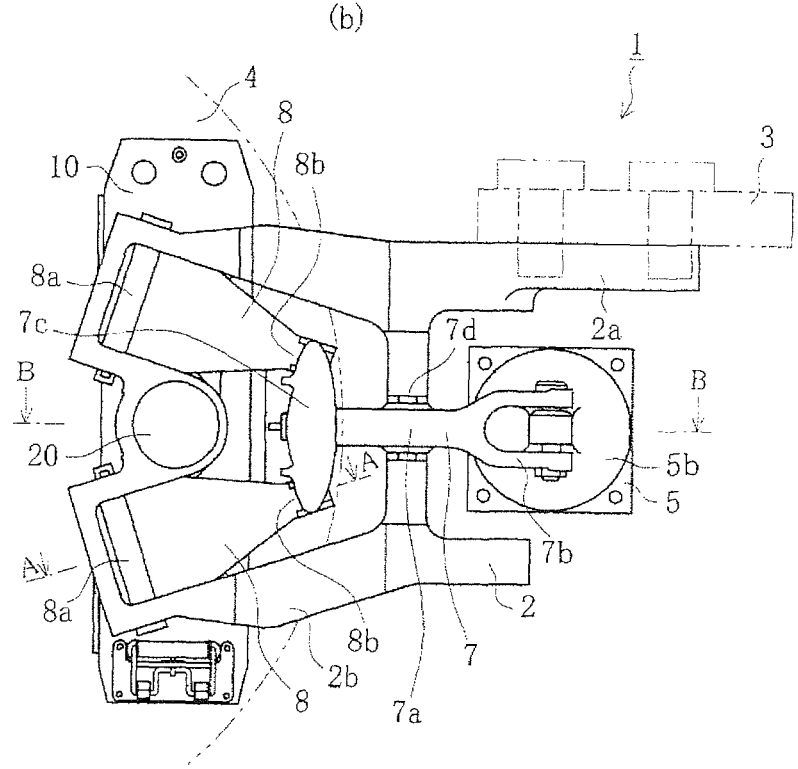

One object of the present invention, which is to further reduce the size of a pneumatic caliper brake device, is achieved by dividing the pressure of the pneumatic brake cylinder into two stages by using a first brake lever and a second brake lever. Another object of the present invention, which is to increase durability by reducing the load on the rotating portions and the sliding portions of the brake lever, is achieved by transmitting the torque generated during braking to the caliper body via the brake lining, the brake head, the torque-receiving pin, and the spherical bearings, and by supporting the brake lining and the brake head in the caliper body via the torque-receiving pin and the spherical bearings.

EXAMPLE

An example of the embodiment of the present invention is described below, making reference to FIGS. 1-4.

Reference Numeral 1 is a caliper brake device of the present invention, in which a rod of a pneumatic cylinder device is caused to protrude so as to be caused to approach a front part of a brake lever, and a disc which rotates together with a wheel due to a brake lining provided on a front part of the brake lever, with the caliper brake device clamping from both sides. The caliper brake device 1 of the present invention is constructed in a manner described below.

Reference Numeral 2 is a caliper body formed with two branches at the front part, so that the front part where the two branches are formed is positioned on the two outer side surfaces on the periphery of a disc 4 when the base part side 2*a* is installed in a bogie 3. The branch-forming portion is referred to below as a branch-forming part 2*b*.

Reference Numeral 5 is a pneumatic brake cylinder device which is installed at a base part side 2*a* of the caliper body 2. The pneumatic brake cylinder device 5 is designed so as to return to its original position as a result of an elastic force of a return spring 6 provided on the inner side when the pneumatic pressure is released.

Reference Numeral 7 is a first brake lever having a center part 7*a* rotatably attached respectively to the respective root base of each branch-forming part 2*b*, for example, in the caliper body 2 to form a pair. By rotatably attaching a base-side end 7*b* to a tip of a rod 5*a* of the pneumatic brake cylinder device 5 and to an end part of a cylinder 5*b* at a side opposite to where the rod 5*a* protrudes, each respective tip 7*c* moves toward and away from each other due to protrusion and retraction of the rod 5*a*.

Reference Numeral 8 is a second brake lever having front part end 8*a* rotatably attached respectively to the tips of each branch-forming part 2*b* of the caliper body 2 to form a pair. By causing the base part ends 8*b* thereof to come into contact with the corresponding inner side of each respective tip 7*c* of the first brake lever 7, so as to move toward and away from each other following the motion of the tip 7*c* of the first brake lever 7 toward and away from each other. The base part ends 8*b* of the second brake lever 8 and the tip 7*c* of the first brake lever 7 are connected with a spring 15 (see FIG. 2(*a*)).

Reference Numeral 9 is a pressing-force transmission member disposed on an inner surface corresponding to a center part tip side of the second brake lever 8. The pressing-force transmission member 9 wobbles slightly in a circumferential direction of the disc 4, and is installed in the caliper body 2 so as to protrude or retract following the toward-and-away motion of the second brake lever 8.

The structure of the pressing-force member 9 is not an issue, as long as the pressing-force transmission member 9 uses the protruding and retracting motion to move two brake linings 11 toward and away from each other, the brake linings 11 being installed, for example, on an inner side facing a brake head 10 via the brake head 10 installed at the front end.

In this example, the pressing-force member 9 is provided with a clearance adjustment mechanism 12 to adjust the clearance between the brake lining 11 and the disc 4.

Figure 2:
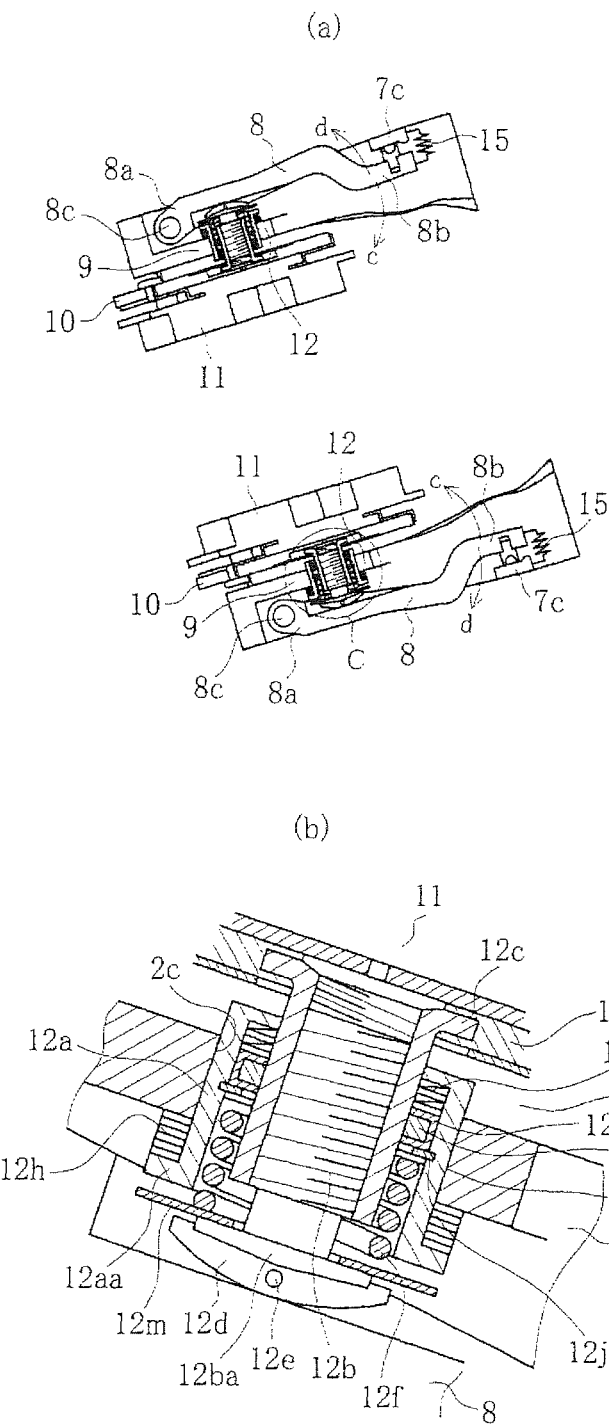
FIG. 2 (*a*) is a sectional view along the line A-A in FIG. 1 (*b*).

The clearance adjustment mechanism 12 has a structure illustrated in FIG. 2 (b), for example. In the drawing, 12a is a hat-shaped piston holder, and a flange 12aa is inserted into a through-hole 2c formed in the caliper body 2 to move freely, so as to be on a side opposite to the brake lining.

12c is a female screw member, and 12b is a male screw member which screws into the female screw member 12c. When these members 12b and 12c are screwed together, the male screw member 12b is inserted so as to move freely within the piston holder 12a, so that a head part 12ba of the male screw member 12b is on a side opposite to the brake lining.

12d is a clutch attached at its center to the second brake lever 8 by a pin 12e, and clutch 12d is able to oscillate at the center of the pin 12e.

12f is a linear coil spring supported by a receiving member 12j within the flange of the piston holder 12a. The coil spring 12f operates to press the head part 12ba of the male screw member 12b against the clutch 12d via a spring presser 12m when the clearance adjustment mechanism 12 is not operating.

12g is a non-linear spring disposed in a recess on a side opposite to the flange of the piston holder 12a. The non-linear spring 12g presses a later-described rubber bushing 12i and a rubber bushing holder 12k against the receiving member 12j of the coil spring 12f when the clearance adjustment mechanism 12 is not operating.

12h is a linear spring disposed between the flange 12aa and the caliper body 2 on the periphery of the piston holder 12a, operating to maintain a position of the piston holder 12a in a fixed position.

A spring constant $\alpha$ of the coil spring 12f, a spring constant $\beta$ of the non-linear spring 12g, and a spring constant $\gamma$ of the linear spring 12h are set so that they satisfy the relationship of $\alpha \approx \beta < \gamma$ when the clearance adjustment mechanism 12 is not operating, and satisfy the relationship of $\alpha < \gamma < \beta$ since the non-linear spring 12g changes non-linearly when the clearance adjustment mechanism 12 is operating.

Moreover, a recovery force of the non-linear spring 12g is set in such a manner that when a compression exceeds a fixed value x for the clearance between the brake lining 11 and the disc 4, there results a force which exceeds a force Fh whereby the rubber bushing 12i, installed between the coil spring 12f on the periphery of the female screw member 12c and the non-linear spring 12g, holds the female screw member 12c. 12k is a rubber bushing holder for holding the rubber bushing 12i.

When the above-described clearance adjustment mechanism 12 is not operating, the head part 12ba of the male screw member 12b presses against the clutch 12d, due to the action of the coil spring 12f, and a clutch surface formed on the outer surface of the head part 12ba of the male screw member 12b engages with the clutch 12d. Therefore, the male screw member 12b and the female screw member 12c do not rotate relative to each other.

On the one hand, either the female screw member 12c or the rubber bushing 12i is in an immobile state, while on the other hand, a relative motion (slipping) occurs between the two when a force greater than the force Fh is applied. However, a relative motion does not arise between the two, even if a force smaller than the force Fh is applied.

Reference Numeral 13 is a torque-receiving pin which immobilizes a tip 13a on the brake head 10 between the two pressing-force transmission members 9. In the example illustrated in FIG. 3 (b), the torque-receiving pin 13 is held at the tip-end side of the branch-forming part 2b of the caliper body 2 via a spherical bearing 14 which is described below.

While a spherical bearing 14 is installed at a shaft part 13b of the torque-receiving pin 13, a rubber sheet 17 and a stop wheel 18 are installed to support the spherical bearing 14 from both sides, on the inner surface of a torque-receiving holder 16 which is movably inserted into a small hole 2da of a stepped hole 2d provided to the caliper body 2.

A flange 16a, which engages with a stepped portion of 2db of the stepped hole 2d, is formed on the torque-receiving holder 16 on a side opposite the brake lining The position of the torque-receiving holder 16 is kept constant because the elasticity of a return spring 19 disposed in a large-diameter hole 2dc of the stepped hole 2d presses on the flange 16a on the brake lining side. Reference Numeral 20 is a cover installed on the large-diameter hole 2dc of the caliper body 2 to support the return spring 19.

Following is an explanation of the operation of the above-described caliper brake device 1 of the present invention.

(During Braking)

Figure 3:
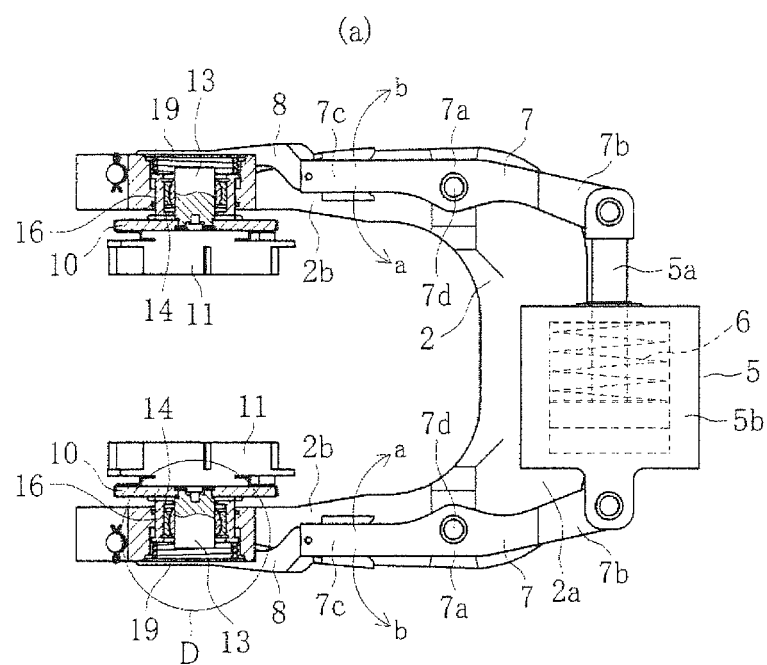
FIG. 3 (*a*) is a sectional view along the line B-B in FIG. 1 (*b*).
Figure 3:
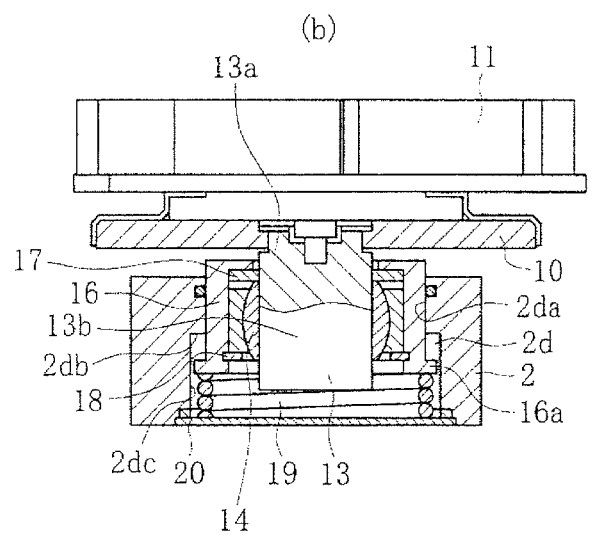

When pneumatic pressure is applied to the pneumatic brake cylinder device 5, the rod 5a protrudes from the cylinder 5b. When the rod 5a protrudes, the first brake lever 7 rotates in a direction a around a fulcrum 7d of the center part 7a (see. FIG. 3 (a)).

When the first brake lever 7 rotates in the direction a, the second brake lever 8 is pressed by the first brake lever 7 to rotate in a direction c around a fulcrum 8c of the front part end 8a (see FIG. 2 (a)).

When the second brake lever 8 rotates in the direction c, the brake lining 11 is pressed in a direction approaching the disc 4 via the pressing-force transmission member 9 which is provided with the clearance adjustment mechanism 12 and via the brake head 10, so as to press on the disc 4 to actuate braking.

The counter-pressure force that occurs during braking is transmitted to the caliper body 2 via the brake lining 11, the brake head 10, the pressing-force transmission member 9, and the second brake lever 8. When this happens, the pressure does not operate on the brake head 10, even though the torque-receiving pin 13 is connected to the brake head 10, and as a result, the counter-pressure force does not operate, because the torque-receiving pin moves together with the brake head 10.

The braking torque generated during braking is transmitted to the caliper body 2 via the brake lining 11, the brake head 10, the torque-receiving pin 13, and the spherical washer 14. When this happens, the pressing-force transmission member 9 wobbles slightly in the circumferential direction of the disc 4, even though the pressing-force transmission member 9 is connected to the brake head 10, but since the torque-receiving pin 13 is affixed so as not to wobble in the circumferential direction of the disc 4, the braking torque is not transmitted to the pressing-force transmission member 9.

(During Brake Release)

When the pneumatic pressure that was operating on the pneumatic brake cylinder device 5 is released, the operation of the return spring 6 disposed within the pneumatic brake cylinder device 5 causes the rod 5a to retract into the cylinder 5b, and the first brake lever 7 rotates in a direction b around the fulcrum 7d (see FIG. 3 (a)).

When the first brake lever 7 rotates in the direction b, the second brake lever 8 is pulled by the spring 15 and rotates in a direction d around the fulcrum 8c of the front part end 8a (see FIG. 2 (a)).

When the second brake lever 8 rotates in the direction d and the coil spring 12f obtains its recovery force, the brake head 10 and the brake lining 11 move in a direction away from the disc 4 and the brake lining 11 separates from the disc 4, resulting in a non-braking state.

Figure 4:
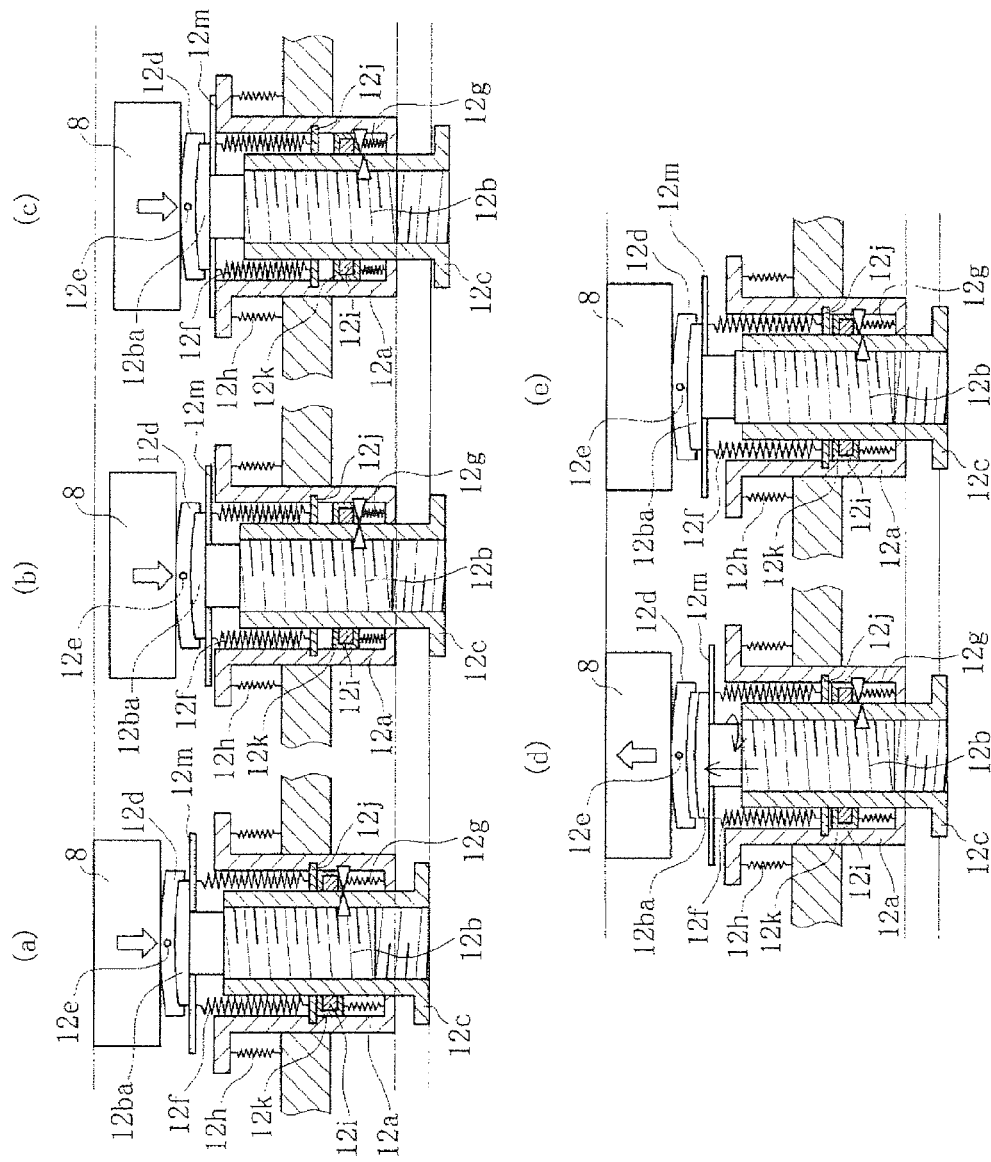
FIGS. 4 (*a*)-(*e*) are drawings showing a sequence of operation of the clearance adjustment mechanism of the caliper brake device for a railway vehicle according to the present invention.

Operation of the clearance adjustment mechanism 12, which is provided to the pressing-force transmission member 9 during braking, is now described, making reference to FIG. 4.

When the second brake lever 8 rotates to the direction c, the male screw member 12b moves to the direction of the disc 4, while the clutch 12d, the clutch surface of the male screw member 12b, and the spring presser 12m compress the coil spring 12f.

In this state, the recovery force of the coil spring 12f causes the clutch surface of the male screw member 12b and the clutch 12d to engage, so the male screw member 12b does not rotate. Therefore, the female screw member 12c, which mates with the male screw member 12b, also does not rotate, but is pressed so as to move in the direction of the disc 4. The brake lining 11 is pressed by the brake head 10 which is immobilized by the female screw member 12c, and pressed against the disc 4. When this pressing action occurs, there is an equal amount of movement of all of the members as a result of pressing by the second brake lever 8.

When the female screw member 12c moves, the rubber bushing 12i and the rubber bushing holder 12k move simultaneously with the same amount of movement to compress the non-linear spring 12g (see the change from FIG. 4 (a) to FIG. 4 (b)).

During this process, when the amount of movement of the female screw member 12c is less than the fixed value x for the clearance between the brake lining 11 and the brake disc 4, the clearance adjustment mechanism 12 does not move. Therefore, when the air pressure that was applied to the pneumatic brake cylinder device 5 is removed, and the pressing force exerted by the second brake lever 8 is no longer operative, the members that had been pressed by the recovery force of the non-linear spring 12g and the coil spring 12f return to their original position (the position (the position shown in FIG. 4 (a)).

On the other hand, the clearance between the disc 4 and the brake lining 11 increases because of the friction between them, and when the amount of movement of the female spring member 12c exceeds the fixed value x for the clearance between the two, the clearance adjustment mechanism 12 operates.

In other words, when the amount of movement of the female screw 12c exceeds the fixed value x for the clearance between the disc 4 and the brake lining 11, the amount of compression of the non-linear spring 12g also exceeds the fixed value x for the clearance, and as a consequence, the recovery force of the non-linear spring 12g exceeds the holding force Fh whereby the female screw member 12c is held by the rubber bushing 12i. Therefore, when the male screw member 12b, the female screw member 12c, the brake head 10, and the brake lining 11 are caused to move in this state, a slipping occurs between the female screw member 12c and the rubber bushing 12i (see FIG. 4 (c)).

When the pneumatic pressure that was applied to the pneumatic brake cylinder device 5 is released after a slipping occurs between the female screw member 12c and the rubber bushing 12i, and the pressing force exerted by the second braking lever 8 is no longer operative, the members that had been pressed by the recovery force of the non-linear spring 12g and the coil spring 12f return to their original position (the position shown in FIG. 4 (a)).

In this state, the clutch 12d and the male screw member 12b become engaged again as previously, if the amount of movement of the female screw member 12c is within the range of the amount of compression of the non-linear spring 12g. By contrast, if the amount of movement of the female screw member 12c exceeds the range of the amount of compression of the non-linear spring 12g, the movement of the female screw member 12c stops at a position where the rubber bushing 12i which is attached to the female screw member 12c makes contact with the receiving member 12j.

On the other hand, the clutch surface of the male screw member 12b and the clutch 12d become disengaged, because the second brake lever 8 is pulled in the direction d by the spring 15, thereby making it possible for the male screw member 12b to rotate. The male screw member 12b, which has become able to rotate, now rotates due to the recovery force of the coil spring 12f, so the clearance distance is adjusted when the male screw member 12b returns to its original position after being released from the female screw member 12c (see the state depicted in FIG. 4 (d)).

As a result of the above, the male screw member 12b returns to its original position, and the rubber bushing 12i returns to the position where it makes contact with the receiving member 12j. On the other hand, the slipping between the female screw member 12c and the rubber bushing 12i continues as before, being in a state of slippage oriented more toward the disk than toward the original position, so the clearance distance becomes adjusted (see the state depicted in FIG. 4 (e)).

The caliper brake device 1 according to the present invention described above is designed to further reduce the size of the pneumatic braking device 5 and the brake lever, because the lever mechanism of the pneumatic brake cylinder device 5 is a two-stage system consisting of the first brake lever 7 and the second brake lever 8. Moreover, this design makes it possible to substitute a pneumatic caliper device for a hydraulic caliper device, without making alterations on the bogie side.

The counter-pressure force that occurs during braking is transmitted to the caliper body 2 via the brake lining 11, the brake head 10, the pressing-force transmission member 9, and the second brake lever 8. On the other hand, the braking torque that occurs during braking is transmitted to the caliper body 2 via the brake lining 11, the brake head 10, the torque-receiving pin 13, and the spherical bearings 14. Therefore, the load on the rotating portions and the sliding portions of the first brake lever 7 and the second brake lever 8 is reduced, thereby increasing the durability.

Moreover, because the brake lining 11 and the brake head 10 are held by the caliper body 2 via the torque-receiving pin 13, and the spherical bearings 14, there is a reduction in the load on the rotating portions and the sliding portions of the second brake lever 8 resulting from vibrations that act on them, thereby increasing the durability.

In addition, because the pressing-force transmission member 9 is provided with the clearance adjustment mechanism 12, it is possible to make constant the protruding length of the rod 5a of the pneumatic brake cylinder device 5, even if the disc 4 and the brake lining 11 are worn. This makes it possible to make the pneumatic brake cylinder device 5 more compact.

The present invention is not limited to the above-described example, and the preferred embodiment may, of course, be advantageously modified within the scope of the technical ideas recited in the claims.

For example, the example describes a device in which the pressing-force transmission member 9 is provided with the clearance adjustment mechanism 12, but the clearance adjustment mechanism 12 does need to be provided.

EXPLANATION OF THE REFERENCE NUMERALS

1 Caliper brake device
2 Caliper body
2a Base part side
2b Branch-forming part
3 Bogie
4 Disc
5 Pneumatic brake cylinder device
5a Rod
5b Cylinder
7 First brake lever
7a Center part
7b Base part side
7c Tip
7d Fulcrum
8 Second brake lever
8a Front part end
8b Base-side end
8c Fulcrum
9 Pressing-force transmission member
10 Brake head
11 Brake lining
12 Clearance adjustment mechanism
13 Torque-receiving pin
13b Shaft part
14 Spherical bearing

The invention claimed is:

1. A caliper brake device for a railway vehicle comprising:
a caliper body formed with two branches so that a front part is positioned on an outer side of two outer side surfaces of a periphery of a brake disc when a base part is installed on a bogie;
a pneumatic brake cylinder device installed at a base part side of the caliper body;
a first brake lever having base part end rotatably attached respectively to a tip of a rod of the pneumatic brake cylinder device and to a cylinder end portion at a side opposite to where the rod protrudes, and having a center part rotatably attached to the caliper body,
so as to form a pair of respective front part which move toward and away from each other, due to a protruding and retracting motion of the rod;
a second brake lever having front part end rotatably attached respectively to the tips of the branches of the caliper body, and having the base part ends respectively making contact with the tips of the first brake lever, so as to form a pair which moves toward and away from each other, following a toward-and-away motion of the first brake lever;
a pressing-force transmission member provided at the front part of a center part of the second brake lever, and which is designed to protrude or retract, following a toward-and-away motion of the second brake lever;
a brake head disposed at the tip of the pressing-force transmission member, and a brake lining disposed on an inner side corresponding to the brake head; and
a torque-receiving pin immobilizes a tip at each respective brake head, and causes a shaft part to be supported at the end portions of each of the branches of the caliper body via spherical bearings,
wherein a braking torque is caused to be received by the caliper body via the brake head, the torque-receiving pin, and the spherical bearings, when the rod of the pneumatic cylinder device is caused to protrude, and the brake lining presses against the brake disc via the first and second brake levers, the pressing-force transmission member, and the brake head.

2. The caliper brake device for a railway vehicle according to claim 1, wherein the clearance adjustment mechanism to adjust the clearance between the two brake linings and the disc is provided with the pressing-force transmission member.

* * * * *